United States Patent
Moore

(10) Patent No.: US 6,707,921 B2
(45) Date of Patent: Mar. 16, 2004

(54) USE OF MOUTH POSITION AND MOUTH MOVEMENT TO FILTER NOISE FROM SPEECH IN A HEARING AID

(75) Inventor: Keith E. Moore, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 87 days.

(21) Appl. No.: 09/991,917

(22) Filed: Nov. 26, 2001

(65) Prior Publication Data

US 2003/0099370 A1 May 29, 2003

(51) Int. Cl.[7] .............................................. H04R 25/00
(52) U.S. Cl. ..................................... 381/327; 704/271
(58) Field of Search .................................. 381/312, 317, 381/318, 327, 328, 329, 150, FOR 132; 704/270, 271, 272, 273, 274, 275, 231, 251; 382/100

(56) References Cited

U.S. PATENT DOCUMENTS

| | | | | |
|---|---|---|---|---|
| 4,757,541 A | * | 7/1988 | Beadles | 704/254 |
| 4,975,960 A | * | 12/1990 | Petajan | 704/251 |
| 5,680,481 A | * | 10/1997 | Prasad et al. | 382/190 |
| 5,806,036 A | * | 9/1998 | Stork | 704/260 |
| 6,377,925 B1 | * | 4/2002 | Greene et al. | 704/271 |
| 2002/0103649 A1 | * | 8/2002 | Basson et al. | 704/270 |

OTHER PUBLICATIONS

Cosatto, E., et al., 2000. "Audio–Visual Unit Selection for the Synthesis of Photo–Realistic Talking–Heads," IEEE (4 pages).

Elenius, K., and Traven, H., 1993. "Multi–Layer Perceptrons and Probabilistic Neural Networks for Phoneme Recognition," In: Proc. Eurospeech 1993 3rd European Conference on Speech Communication and Technology, Berlin, Germany, pp. 1237–1240.

Basu, S., et al., 1998. "3D Modeling and Tracking of Human Lip Motions," Proceedings of the IEEE International Conference on Computer Vision, Bombay, India, pp. 337–343.

Leung, W.H., et al., 2000. "Realistic Video Avatar," IEEE (4 pages).

McAllister, D., et al., 1998. "Automated Lip–Sync Animation as a Telecommunications Aid for the Hearing Impaired," 1998 IEEE 4th Workshop on Interactive Voice Technology for Telecommunications Applications (6 pages).

Melek, Z., and Akarun, L., 2000. "Automated Lip Synchronized Speech Driven Facial Animation," IEEE (2 pages).

Noh., J., and Neumann, U., 2000. "Talking Faces," IEEE (4 pages).

Reveret, L., and Benoit, C., 1998. "A New 3D Lip Model for Analysis and Synthesis of Lip Motion in Speech Production," Proc. of the Second ESCA Workshop on Audio–Visual Speech Processing, AVSP 1998 (6 pages).

(List continued on next page.)

*Primary Examiner*—Curtis Kuntz
*Assistant Examiner*—Brian Ensey

(57) ABSTRACT

A hearing aid includes an image sensing device, a sound input transducer, a sound output transducer, and a processor. The image sensing device detects an image from a selected region of a user of the hearing aid while the sound input transducer receives sound and produces an audio signal representative of the sound. The sound output transducer receives the audio signal and converts the audio signal to a sound wave that is provided to the user. The processor receives the image, analyzes the image to determine an existence of human-generated sound, and provides the audio signal from the sound input transducer to the sound output transducer when human-generated sound is detected. The audio signal is provided at a first level when human-generated sound is detected and is provided at a second level in an absence of human-generated sound.

20 Claims, 3 Drawing Sheets

OTHER PUBLICATIONS

Stork, D.G., and Hennecke, M.E., 1996. "Speechreading by Humans and Machines, Models, Systems and Applications," Accoustics Bulletin, vol. 22, #3, May–Jun., 1997, p. 30.

Stork, D.G., and Hennecke, M.E., 1996. "Speechreading: An overview of image processing, feature extraction, sensory integration and pattern recognition techniques," Proceedings of the 2nd International Conference on Automatic Face and Gesture Recognition, pp. xvi–xxvi.

"Lipsynch: Phoneme examples," Mar. 27, 1998, Hash Animation Master; available on website: http://www.geocities.com/~gcmartin/phoneme_examples.html (5 pages).

"Phonemic and Phonetic: Orthographic Differences That Make a Difference," Centre for Linguistics, Univ. of Western Australia; available on website: www.arts.uwa.edu.au/Ling-WWW/LIN101–2001/NOTES–101/phoneme.html (7 pages).

* cited by examiner

USE OF MOUTH POSITION AND MOUTH MOVEMENT TO FILTER NOISE FROM SPEECH IN A HEARING AID

FIELD OF THE INVENTION

The present invention relates generally to a hearing aid, and more particularly to a hearing aid for selectively providing sound to a user.

BACKGROUND OF THE INVENTION

Hearing impairment or loss is a problem suffered by many people. Hearing problems may be congenital or may be due to injury or disease, exposure to damaging sound levels, aging, etc.

A common approach to hearing problems is the use of a hearing aid. Hearing aids mechanically pick up sound, convert it into an electronic signal, amplify the signal, and convert it back to sound which is applied to the ear of the user. In this manner, a higher sound level is provided directly into the ear canal of a user of the hearing aid. The user therefore can partially mitigate hearing problems.

A drawback of prior art hearing aids is that they not only pick up and amplify desired sounds, but they also pick up and amplify noise. Noise is almost always present, whether in the foreground or background. If the noise is strong enough, it can interfere with or drown out the desired sound. As a result, prior art hearing aids in some situations provide too much amplified noise to the user. Unfortunately, another drawback of a prior art hearing aid is that it continuously provides sound to the user, and cannot discriminate between desired sound and undesired sound. The prior art hearing aid does not give the user any guidance between background noise and speech. The user therefore must differentiate between noise and speech. In the prior art, the user must typically watch the lip movement of a speaker in order to determine when to listen to the output of the hearing aid and when to ignore the output.

Therefore, there remains a need in the art for improvements in hearing aids.

SUMMARY OF THE INVENTION

A hearing aid comprises an image sensing device, a sound input transducer, a sound output transducer, and a processor. The image sensing device detects an image from a selected region of a user of the hearing aid while the sound input transducer receives sound and produces an audio signal representative of the sound. The sound output transducer receives the audio signal and converts the audio signal to a sound wave that is provided to the user. The processor receives the image, analyzes the image to determine an existence of human-generated sound, and provides the audio signal from the sound input transducer to the sound output transducer when human-generated sound is detected. The audio signal is provided at a first level when human-generated sound is detected and is provided at a second level in an absence of human-generated sound.

DETAILED DESCRIPTION

Figure 1:
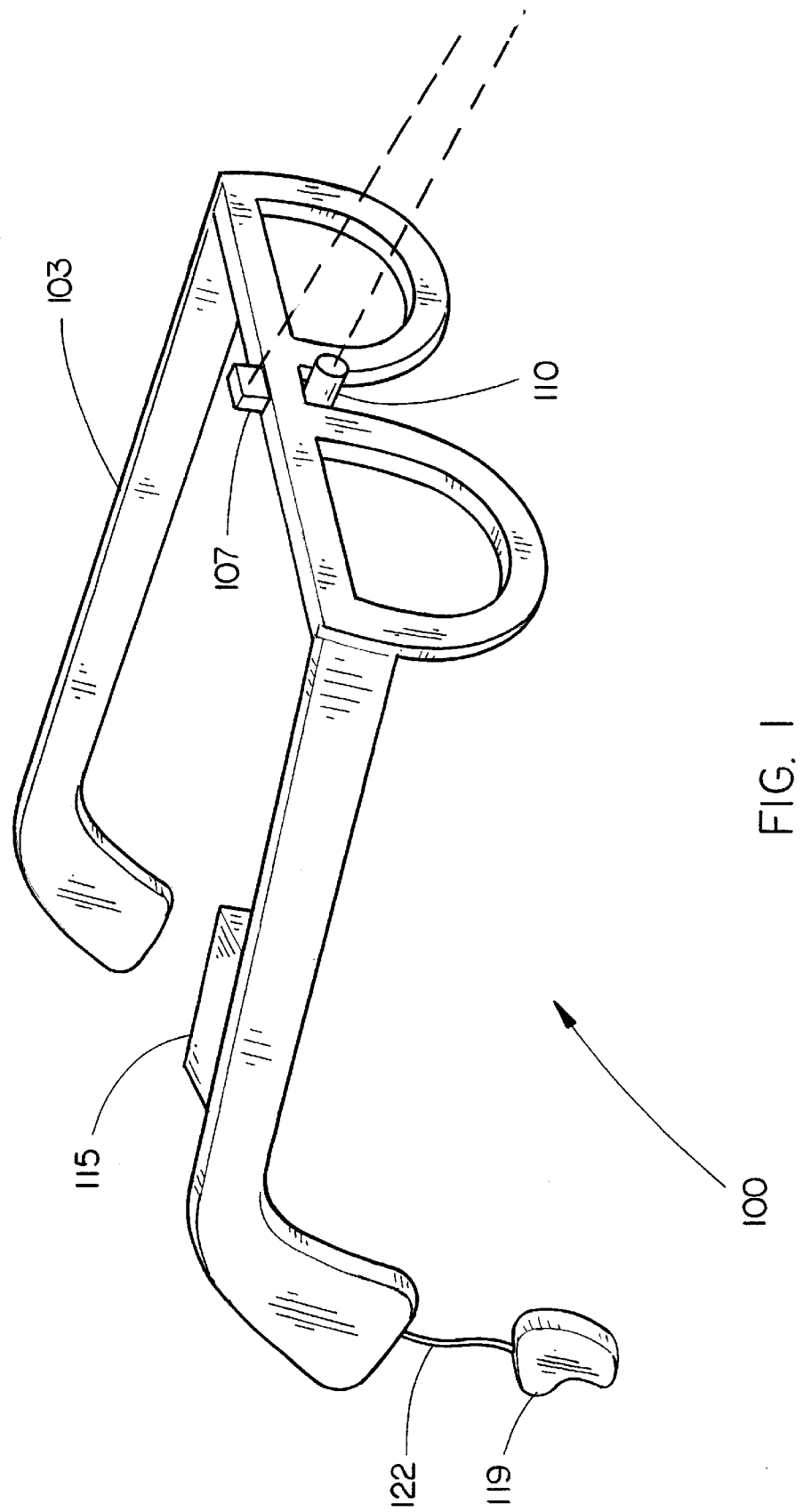
FIG. 1 is a block diagram of a hearing aid.

FIG. 1 is a block diagram of a hearing aid 100 according to one embodiment of the invention. The hearing aid 100 includes a sound input transducer 107, such as a microphone, an image sensing device 110, such as a charge-coupled device (CCD) image sensor or a complementary metal oxide semiconductor (CMOS) image sensor, a processor 115, and a sound output transducer 119, such as a speaker. The above components are fastened to a headpiece 103 in an appropriate manner.

In operation, the processor 115 may continuously capture an audio signal from the input transducer 107, with the audio signal including speech if speech is occurring. It should be understood that the term speech means any audible sound produced by a human speaker, and not necessarily words or intelligible sounds. Simultaneously, the processor 115 receives a series of chronological images from the image sensing device 110, such as a video signal, for example. The image sensing device 110 is positioned to capture a series of chronological images corresponding to a selected region of a user of the hearing aid 100. The selected region may be a region where a speaking person is most likely to be positioned with respect to the user. If positioned in this manner, the images will likely include a speaker to whom the user may be listening. It should be understood that although the image sensing device 110 may be oriented in other directions, the user will most likely be listening to a speaker located directly in front of the user and within a predetermined range.

Alternatively, the selected region may be any other region desired by the user. In one embodiment, the selected region may be determined by the eye position of the user. The eye position of the user may be inferred by the approximate position of the viewer's head (i.e., the user will usually be looking straight ahead). In another embodiment, the user's eye position may be determined by an eye scanning device that substantially continuously tracks the movement of one or both eyes.

The processor 115 processes the series of chronological images according to an image analysis algorithm in order to locate the mouth of the speaker and further to determine when the speaker is speaking. If mouth movement is detected, it may be assumed that speech is occurring. Therefore, if mouth movement is detected, the processor 115 provides the audio signal to the sound output transducer 119. In turn, the sound output transducer 119 provides a sound wave to the user. Conversely, if no mouth movement is detected, the audio signal may be attenuated by an audio filter or may not be provided to the sound output transducer 119. The audio filter may be a hardware or software realized audio filter and may attenuate and/or shape the audio signal.

Alternatively, the hearing aid may operate by determining the position of the speaker's mouth in order to determine a phoneme being uttered by the speaker. A phoneme is a basic unit of speech for a particular language. Therefore, each phoneme is a single, distinctive component of speech. For example, the English language is commonly held to be formed of 45 phonemes. Other languages may employ fewer or greater numbers. Speech analysis typically breaks speech into discrete phonemes for processing, such as in an electronic speech-to-text conversion, for example. By detecting phonemes, speech may be detected.

In this embodiment, the mouth movement does not have to be detected. In the mouth position embodiment, every mouth position has an associated probability of a particular phoneme being generated. As a result, the processor 115 may detect a phoneme currently being uttered and may select a particular filter from among a set of audio filters. Moreover, through a probability analysis of the speaker's current mouth position, the processor 115 may even predict a phoneme that is about to be uttered. The filter selection may therefore be based on a mouth position, a mouth movement, or both.

In an alternative embodiment, the hearing aid 100 may supply the audio signal even when speech is not determined to be occurring, but instead may be supplied at a first, higher level when speech is detected and may be supplied at a second, lower level in the absence of detected speech. The first level is of a greater amplitude than the second level, and may comprise more than one amplitude level (i.e., the hearing aid 100 may employ multiple audio filters). The second level may be a substantially zero amplitude level or may be any amplitude level between zero and the first amplitude level. The first and second levels may optionally be user-settable. In this manner, the hearing and understanding of the user may be aided and improved.

In phoneme detection, a captured mouth image or images may be compared to a predetermined set of phoneme mouth images. A phoneme may be detected when the differences between a captured image(s) and an image of a predetermined set of phoneme mouth images is statistically insignificant, i.e., when the differences are below a predetermined threshold. Therefore, a particular mouth shape (or mouth movement between frames) may be found to substantially correspond to an articulated speech phoneme. The detected mouth movement and/or mouth position may be used to select and apply a filter to the audio signal. In addition, a detected mouth movement and/or mouth position may further be used to predict which filter to apply in the near future (i.e., the tracking of the mouth motion gives an idea of which filter of a set of filters will most likely match the eventual phoneme).

The phoneme detection may not only admit the audio signal based on mouth movement and/or mouth position, but may also take into account the distance to the speaker. This may be accomplished by relating the proportions of the lips in a captured mouth image to a predetermined lip size threshold in order to obtain an approximate amplitude of the speech. As a result, the distance to the speaker may be determined based on the relative size of the lips of the speaker. This technique is useful for filtering out background noise. Furthermore, the distance may be used to control the amplitude of the admitted audio signal. The amplitude of the admitted audio signal may be varied in relation to the distance to the speaker. Moreover, the distance to the speaker may be used to determine when to apply a filter to the audio signal. In most cases, the application of the filter will be substantially instantaneous (i.e., there is not a significant difference from the time the visual arrives to the time the sound arrives). However, when the speaker is relatively distant, there may be a delay before the filter is applied to the audio signal, in order to accommodate the transit time of the sound.

The headpiece 103 may be any type of device that can be worn by the user of the hearing aid 100 and that can support the components thereof. The headpiece 103 may be any type of eyeglasses, as shown. Alternatively, the headpiece 103 may be a headband or harness, a visor, a cap, a hat, or alternatively a lapel pin or piece of jewelry, etc. The various components may be mounted to the headpiece 103 in a fixed or removable fashion. In addition, the sound output transducer 119 may be attached to the headpiece 103 by one or more electrical wires 122, through which the audio signal is provided to the sound output transducer 119.

The sound input transducer 107 may be any type of transducer capable of converting sound waves into a representative electrical audio signal. The sound input transducer 107 may be a passive or active microphone, for example. In one embodiment the sound input transducer 107 further comprises a directional microphone.

The sound input transducer 107 is positioned to pickup speech generally from a speaking person positioned in a frontal region of the user, such as a person speaking generally to the user. Therefore, the sound input transducer 107 is substantially aligned with the image sensing device 110 in order to capture the audio signal from the same volume of space from which the image sensing device 110 captures a series of chronological images (the alignment is indicated by dashed lines in the figure).

The image sensing device 110 may be any type of camera or other image capturing device, although a small, compact unit is desirable. In a preferred embodiment, the image sensing device 110 is a digital video camera. Alternatively, the image sensing device 110 may be an analog video camera and the processor 115 may convert the resulting analog video signal to a digital representation for analysis. In another alternative embodiment, the image sensing device 110 may be a still digital camera that captures images at predetermined time periods.

The sound output transducer 119 may be any type of suitable transducer that is capable of receiving the audio signal and generating sound from the audio signal. The sound output transducer 119 in one embodiment is an audio speaker. Alternatively, the sound output transducer 119 may be a conventional hearing aid. The conventional hearing aid may optionally condition the audio signal, including filtering and amplifying the audio signal. In addition, the sound output transducer 119 may include a conventional built-in hearing aid microphone, with the sound output transducer 119 being switchable between the conventional built-in microphone and the sound input transducer 107. Moreover, the sound output transducer 119 may include a power source, such as a battery.

The processor 115 may be any type of general purpose processor. The processor 115 is capable of transmitting the audio signal from the sound input transducer 107 to the sound output transducer 119. The processor 115 may accomplish this in various ways, such as by switching or interrupting the audio signal, by enabling and disabling the generation of the audio signal, etc.

The hearing aid 100 may also include a memory (not shown) communicating with the processor 115. The memory may be internal or external to the processor 115. The memory may store an image analysis algorithm that is used by the processor 115 to detect speech in the series of chronological images from the image sensing device 110. In the series of chronological images, the mouth of the speaker may be identified in the images and differences between various images may signify speech.

The hearing aid 100 may optionally include an enable switch (not shown) that allows the user to enable or disable the transmission of the audio signal from the sound input transducer 107. Therefore, the user may enable or disable the audio signal as desired, such as when sound levels are too high, when too many speakers are present, when background noise is strong, etc.

It should be noted that alternatively various components of the hearing aid 100 may be remotely located from the sound output transducer 119. For example, some of the components may be located in a backpack, belt unit, pocket unit, etc., and may be connected via a wire or harness to the sound output transducer 119.

Figure 2:
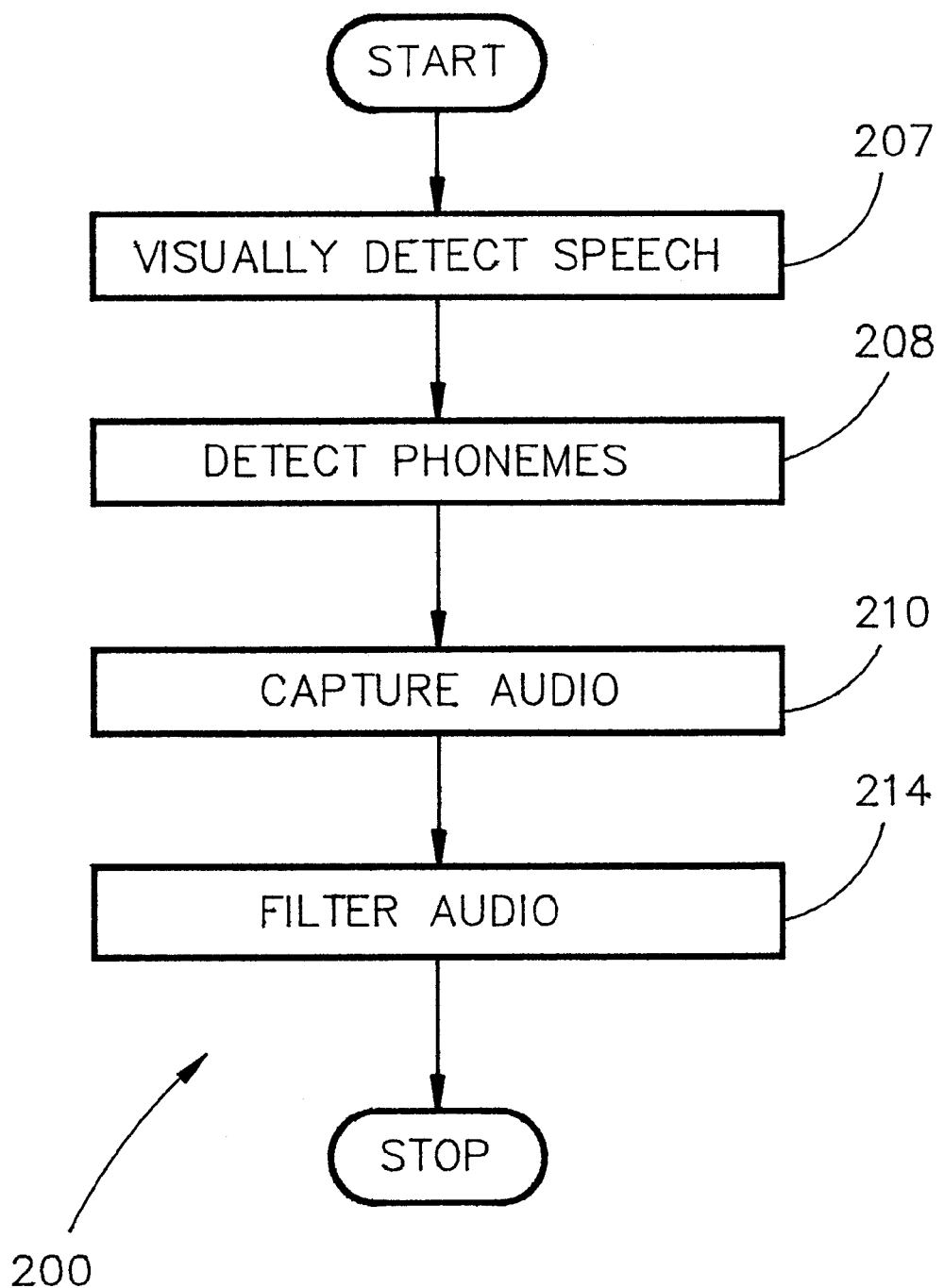
FIG. 2 is a flowchart of a computer-implemented method for providing an audio signal to a hearing aid.

FIG. 2 is a flowchart 200 of a computer-implemented method for providing an audio signal to a hearing aid output transducer according to the invention. In step 207, speech (i.e., human-generated sound) is visually detected. The speech is the speech of a person near the user of the hearing aid 100. The speech may be detected by capturing a series of chronological images or a video signal of the speaker and analyzing the speaker's mouth to detect mouth movement.

In optional step 208, phonemes may be detected in order to determine whether the captured images of the speaker include mouth movement (i.e., speech). As previously discussed, the captured mouth images may be compared to a predetermined set of phoneme mouth images, where a particular mouth shape (or a mouth movement between frames) substantially corresponds to an articulated speech phoneme. The phoneme comparison may be performed on single mouth images or sets of mouth images, and allows the hearing aid 100 to visually detect speech. Speech therefore may be detected when the differences between a captured image(s) and a predetermined set of phoneme mouth images is statistically insignificant, i.e., when the differences are below a predetermined threshold.

Sound can be generated even if the person generating the sound isn't moving his or her mouth. Such a sound is still desired to be acted on in providing the audio signal to the sound output transducer 119. Therefore, the filter that is applied may be determined and selected according to the mouth position of the speaker, and the probability of the likely phoneme that is associated with the mouth movement and/or mouth position.

In step 210, an audio signal is captured. The audio signal may contain the speech. The audio signal is preferably directionally captured from the same direction as the series of chronological images so that the captured audio signal and the captured mouth movement are both from a speaker directly in front of the user of the hearing aid 100. It should be understood that the audio signal is captured substantially simultaneously with the series of chronological images.

In step 214, an audio signal including the speech is filtered and provided to the output transducer of the hearing aid 100. As a result, the audio signal is provided to the user. The audio signal is provided (filtered) at a first level when speech is detected, and is provided at a second level when speech is not detected. The first level is of a greater amplitude than the second level, and may comprise more than one amplitude level (i.e., the hearing aid 100 may employ multiple audio filters). The second level may be a substantially zero amplitude level or may be any amplitude level between zero and the first amplitude level.

Figure 3:
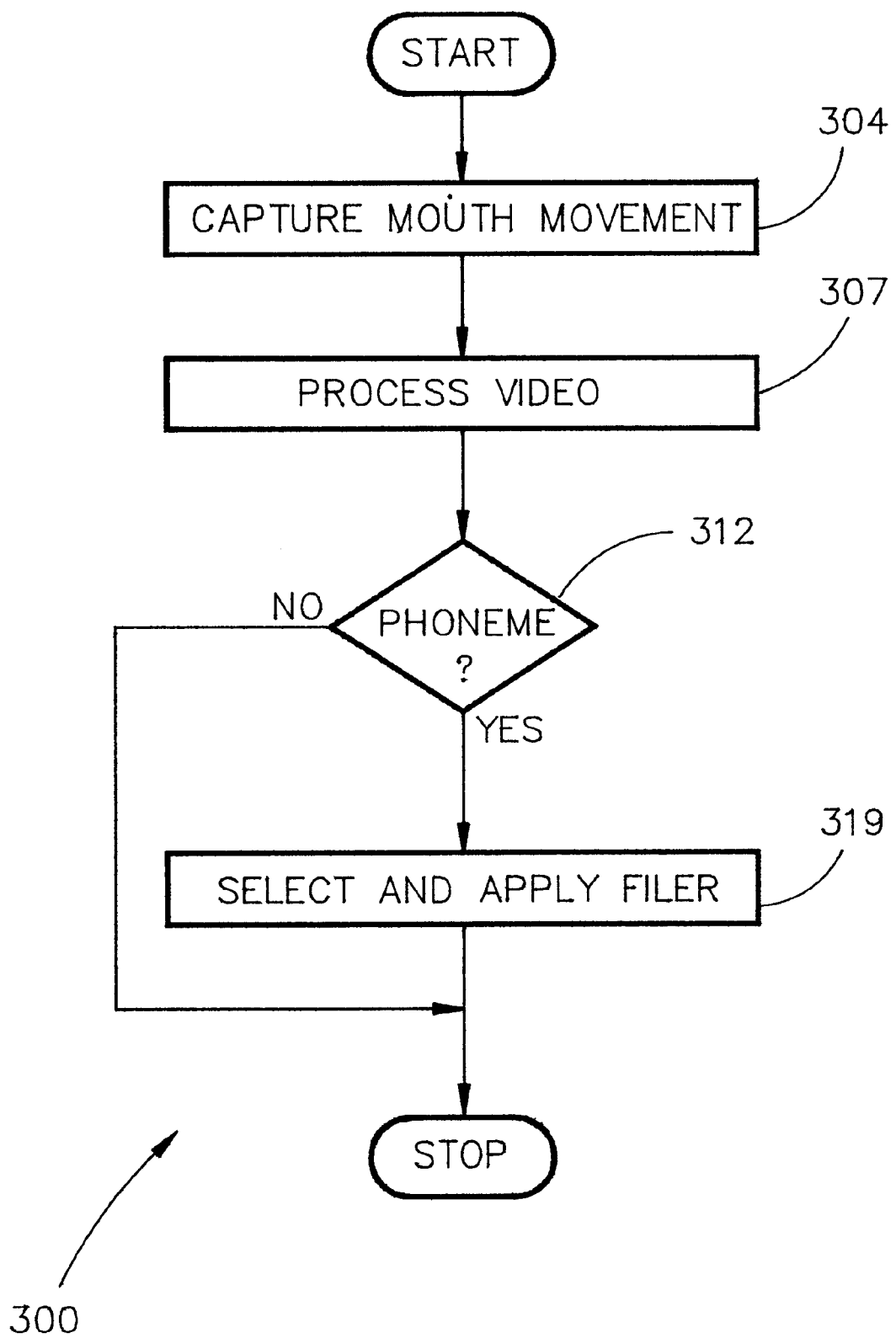
FIG. 3 is a flowchart of another computer-implemented method for providing an audio signal to the hearing aid.

FIG. 3 is a flowchart 300 of a computer-implemented method for providing an audio signal to the output transducer of a hearing aid according to another embodiment of the invention. In step 304, a mouth movement of a speaker is captured. This may comprise capturing a mouth region of the speaker in a series of chronological images.

In step 307, the series of chronological images are processed in order to detect mouth movement and/or mouth position. This may include employing an image analysis algorithm that is used to identify the mouth region of the speaker. Further, this may include visually detecting phonemes in the mouth movement and/or mouth position of the speaker, as previously discussed.

In step 312, it is determined whether a phoneme has been found or predicted (a phoneme may be predicted from a current mouth position). If so, the method proceeds to step 319; otherwise, it exits.

In step 319, because a phoneme has been found or predicted, a filter is selected and applied to the audio signal. The filter may transform (i.e., attenuate and/or shape) the audio signal to be provided to the sound output transducer 119 of the hearing aid 100. The audio signal may be captured in any known manner and may be captured substantially simultaneously with the capture of the corresponding mouth movement and/or mouth position. Therefore, the audio signal may be supplied to the hearing aid output at a first level when mouth movement is detected and may be supplied at a second level when mouth movement is not detected. The first level may be of a greater amplitude than the second level. The second level may be a substantially zero amplitude level or alternatively may be any amplitude level between zero and the first amplitude level.

In this manner, the user may not receive the audio signal and corresponding sound unless a speaker is in a predetermined position with respect to the user and the speaker is determined to be speaking. Alternatively, the user may receive the audio signal at the lower second level if it is determined that no phoneme is occurring (i.e., no speech is occurring).

The hearing aid 100 of the invention presents several benefits to the user. The hearing aid 100 may reduce noise by selectively providing an audio signal (i.e., sound) to the user. In addition, the hearing aid 100 may indicate to the user when to listen to the output of the hearing aid and when to pay attention to the speaker. This may not only increase hearing and comprehension on the part of the user, but may also aid the user in lip reading and in other non-verbal communication.

I claim:

1. A hearing aid, comprising:
   an image sensing device for detecting an image from a selected region of a user of said hearing aid;
   a sound input transducer which receives sound and produces an audio signal representative of said sound in response;
   a sound output transducer which receives said audio signal and converts said audio signal to a sound wave that is provided to said user; and
   a processor which receives said image, analyzes said image to determine an existence of human-generated sound, and provides said audio signal from said sound input transducer to said sound output transducer when said human-generated sound is detected;
   wherein said processor controls admission of said audio signal to said sound output transducer in order to provide said audio signal at a first level when human-generated sound is detected and to provide said audio signal at a second level in an absence of human-generated sound.

2. The hearing aid of claim 1, wherein said processor determines said existence of said human-generated sound based on a mouth movement captured in said image.

3. The hearing aid of claim 1, wherein said processor determines said existence of said human-generated sound based on a mouth position captured in said image.

4. The hearing aid of claim 1, wherein said image sensing device and said sound input transducer are worn by said user.

5. The hearing aid of claim 1, wherein said sound input transducer comprises a directional sound input transducer focused on said selected region.

6. The hearing aid of claim 1, wherein said processor controls admission of said audio signal to said sound output transducer by selection of an audio filter from a predetermined set of audio filters.

7. The hearing aid of claim 1, further comprising a memory communicating with said processor and storing an image analysis algorithm capable of detecting a mouth movement or a mouth position in said image.

8. The hearing aid of claim 1, wherein said image sensing device comprises a video camera and said image comprises a video signal.

9. The hearing aid of claim 1, wherein said sound input transducer is substantially aligned with said image capturing device.

10. The hearing aid of claim 1, wherein said selected region is determined by an eye position of said user.

11. A computer-implemented method for providing an audio signal to a hearing aid, comprising the steps of:

visually detecting human-generated sound of a speaker;

capturing an audio signal corresponding to said human-generated sound; and providing said audio signal to a sound output transducer of said hearing aid at a first level when said human-generated sound is detected and providing said audio signal at a second level when said human-generated sound is not detected.

12. The method of claim 11, wherein the step of visually detecting human-generated sound further comprises determining an existence of said human-generated sound based on a mouth movement captured in said image.

13. The method of claim 11, wherein the step of visually detecting human-generated sound further comprises determining an existence of said human-generated sound based on a mouth position captured in said image.

14. The method of claim 11, wherein said first level is greater in amplitude than said second level.

15. The method of claim 11, wherein said second level is substantially zero.

16. The method of claim 11, wherein the step of visually detecting human-generated sound further comprises the steps of:

capturing a series of chronological images from a selected region of said user, including capturing a mouth region of said speaker; and processing said series of chronological images according to an image analysis algorithm.

17. The method of claim 11, wherein the step of visually detecting human-generated sound further comprises visually detecting human-generated sound of said speaker when said speaker is conversing with said user and said speaker is positioned in a selected region of said user.

18. The method of claim 11, wherein the step of visually detecting human-generated sound further comprises the steps of:

comparing one or more captured image frames to a predetermined set of phoneme mouth images;

statistically determining if a mouth region in said one or more captured image frames substantially matches a phoneme mouth image in said predetermined set of phoneme mouth images;

determining that a phoneme is being produced by said speaker if said mouth region in said one or more captured image frames substantially matches said phoneme mouth image in said predetermined set of phoneme mouth images; and selecting an audio filter corresponding to said phoneme from a predetermined set of audio filters.

19. The method of claim 18, wherein said audio filter transforms said audio signal to said first level.

20. A computer-implemented method for providing an audio signal to a hearing aid, comprising the steps of:

capturing a series of chronological images of mouth movement of a speaker;

capturing an audio signal;

comparing one or more captured image frames to a predetermined set of phoneme mouth images;

statistically determining if a mouth region in said one or more captured image frames substantially matches a phoneme mouth image in said predetermined set of phoneme mouth images;

determining that a phoneme is being produced by said speaker if said mouth region in said one or more captured image frames substantially matches said phoneme mouth image in said predetermined set of phoneme mouth images; and selecting an audio filter corresponding to said phoneme from a predetermined set of audio filters;

wherein said audio signal is provided to said sound output transducer at a first level when said phoneme is detected and is provided to a sound output transducer of said hearing aid at a second level when said phoneme is not detected.

* * * * *